Sept. 13, 1932.   A. L. STEWART   1,877,205
METHOD OF AND APPARATUS FOR GRINDING CURVED TOOTH GEARS
Filed May 19, 1927   2 Sheets-Sheet 1
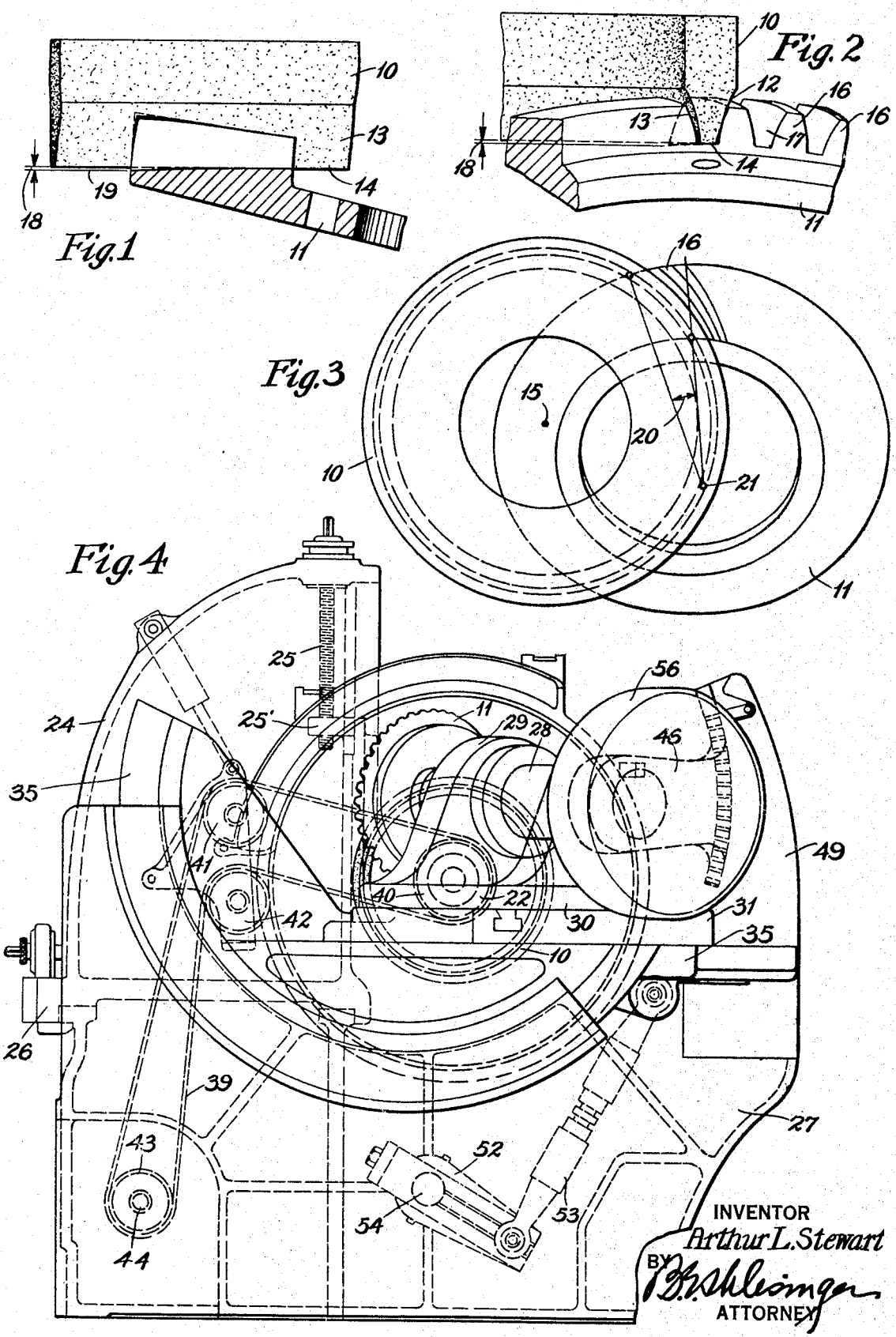

Patented Sept. 13, 1932

1,877,205

UNITED STATES PATENT OFFICE

ARTHUR L. STEWART, OF ROCHESTER, NEW YORK, ASSIGNOR TO GLEASON WORKS, OF ROCHESTER, NEW YORK, A CORPORATION OF NEW YORK

METHOD OF AND APPARATUS FOR GRINDING CURVED TOOTH GEARS

Application filed May 19, 1927. Serial No. 192,722.

The present invention relates to longitudinally curved tooth gears and particularly to a method and machine for grinding longitudinally curved tooth or spiral bevel gears.

Longitudinally curved tooth or spiral bevel gears are commonly generated with a face mill, having straight profiled cutting edges, representing a basic gear whose tooth surfaces are conical surfaces of revolution. It has already been proposed to use a grinding wheel having side edges of straight profile and similar in construction to the face milling cutter and to grind the gears in a generating operation. In many instances, this offers a very satisfactory method. The purpose of the present invention is to provide a method for grinding longitudinally curved tooth gears which will be more rapid than that described and which will, at the same time, require no additional motions.

In generating a bevel gear, whether in grinding or cutting, the tool and blank are rolled relatively to each other through an angle far enough for a point of the cutting edge of the tool to pass completely over the profile of the gear tooth to generate the whole tooth profile. The profile of a tooth so generated is curved from top to bottom. Hence, if a tool is suitably curved profile, as, for instance, of circular arc profile is employed, the whole tooth profile can be ground at once and without any generating roll. Now a grinding wheel of annular form offers among other things, the advantage that by a simple rotation of the grinding wheel on its axis, the grinding surface will move over the lengthwise tooth surface of the gear from end to end. The tip surface of such a wheel will lie in a plane perpendicular to its axis. The teeth of a longitudinally curved tooth gear, are, however, inclined longitudinally to the straight generatrices of the pitch surface of the gear. They may be said to bend around the cone or cylinder on which they are formed. A tool whose tip surface lies in a plane and which is rotated in a fixed position relative to the gear will not be able, therefore, to grind such a gear to full depth except at one point. To grind the teeth to full depth along their length, a relative motion must be imparted between the wheel and the gear through an angle sufficient to effect contact between the tip surface of the wheel and the bottom of the tooth space of the blank all along the length of said tooth space. The amount of angular motion required is determined by the spiral or tooth inclination angle of the teeth and in spiral bevel gears is equal to the face advance of the teeth of the gear or the angle, measured at the gear apex, between the inner and the outer ends of the teeth of the gear. With the present invention it is proposed, therefore, to grind longitudinally curved tooth gears with a rotary annular grinding wheel of suitably curved profile by rotating the wheel on its axis in engagement with the gear and simultaneously imparting a relative motion between the grinding wheel and gear sufficient to grind the teeth to their full depth along their whole length. This method of grinding requires no additional motions and no additional machine parts, over that heretofore proposed, and will, it is believed, in most instances effect a saving in time of approximately a half over that which would otherwise be required for grinding spiral bevel gears with a straight profiled annular grinding wheel. The present invention is particularly applicable to salvaging operations and is especially suited for the grinding of the gear or larger member of a pair of spiral bevel gears.

One method of practising this invention and one embodiment of a machine constructed according to this invention are shown in the accompanying drawings, in which:

Figures 1 and 2 are sections, taken substantially at right angles to each other, and showing a grinding wheel, such as might be employed with this invention, in grinding engagement with a generated longitudinally curved tooth bevel gear, portions only of the grinding wheel and gear being shown;

Figure 3 is a plan view showing a wheel and gear, such as illustrated in Figures 1 and 2, in operative engagement; and Figures 4 and 5 are a side elevation and plan view, respectively, of a machine constructed according to and for practising this invention.

Figure 5:
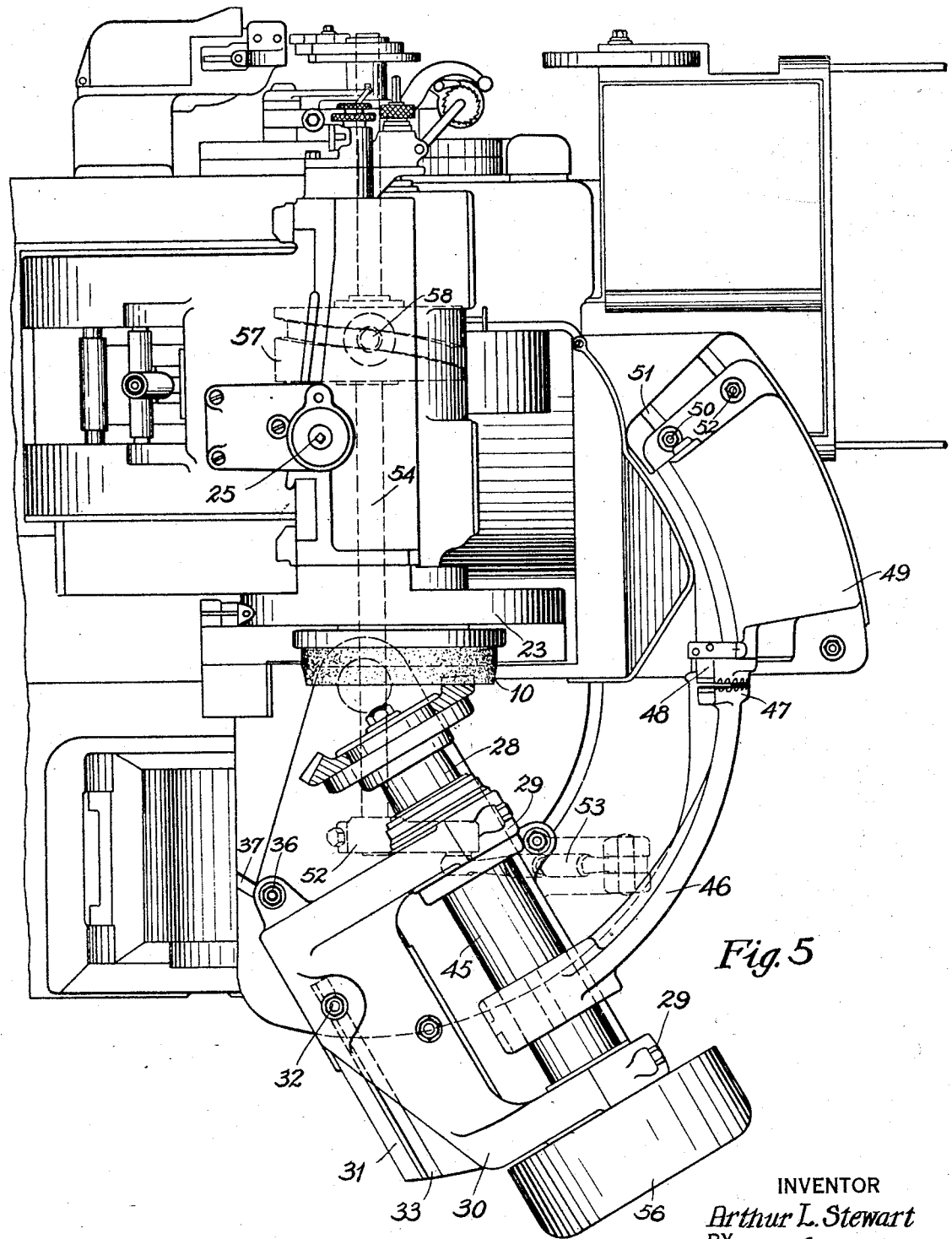

Figures 1, 2 and 3 show a grinding wheel 10 of annular form and constructed according to this invention in grinding engagement with a generated curved tooth bevel gear 11 which has previously been cut and hardened. The grinding wheel is provided with active side surfaces 12 and 13 curved, preferably, along circular arcs and its tip surface 14 lies in a plane perpendicular to its axis 15. The diameter of the grinding wheel is so chosen as to conform to the lengthwise curvature of the teeth 16 of the gear 11 to be ground. The profile curvature of its sides will be so chosen as to closely approximate the profile curvature of the side tooth surfaces 17 of the gear teeth.

The teeth of the gear being curved longitudinally do not lie in a radial plane of the gear, but bend around the conical surface. As can be seen clearly from Figures 1 and 2, the plane 18 of the tip surface 14 of the grinding wheel can be tangent to the root cone 19 of the gear at only one point in any one instant. To grind the sides of the teeth of the gear to full depth along their whole length, therefore, the grinding wheel and gear must be moved relatively to each other to bring all the points of the tooth bottom successively into the plane of the tip surface of the grinding wheel. As will be obvious, the amount of motion required is dependent upon the tooth inclination or spiral angle of the gear. It must be such as to roll the wheel and gear relatively to each other through an angle equal to the face advance 20 of the teeth of the gear, or the angle between the inner and outer ends of the teeth measured at the pitch cone apex 21. With the present invention, therefore, gears may be ground by rotating a grinding wheel 10 of curved profile on its axis 15 while simultaneously producing a relative rolling motion between the grinding wheel and gear about the apex 21 of the gear and through an angle equal to the angle 20 of the face advance of the gear teeth.

This invention effects a very considerable saving in the time required to grind a spiral bevel gear, inasmuch, as it reduces very considerably the amount of relative rolling motion required to grind the tooth profiles.

Preferably, the tool will be so positioned relative to the blank that its axis is parallel to the axis about which the rolling motion takes place, as this simplifies the construction of a machine for practising this invention and eliminates the angular adjustment of the tool which would otherwise be required to incline the tool axis to the axis about which the rolling motion takes place.

The grinding wheel may be so constructed as to grind the two adjacent space bounding tooth surfaces of a gear simultaneously. Preferably, however, the point width of the grinding wheel or width of the wheel at its tip 14 will be made less than the width of a tooth space and one side surface of the gear teeth ground at a time, only, the wheel and gear being reset relatively to each other for grinding the opposite side tooth surfaces.

Figures 4 and 5 show one form of machine constructed according to this invention. The grinding wheel 10, which is of curved side profile, as already described, is mounted upon a spindle 22 journaled in a support 23 which is vertically adjustable upon a column 24 by means of a screw 25 journaled in the column and engaging a nut 25' secured to the support. The column 24 is adjustably secured to a carriage 26 which is mounted for sliding movement upon the frame 27 of the machine. The gear 11 is secured to a spindle 28 which is journaled in bearings 29 on a slide 30. The slide 30 may be adjusted upon a plate 31 in a direction longitudinally of the axis of the gear spindle 28 in order to adjust the gear for varying cone distances. The slide 30 may be secured in any adjusted position by means of bolts 32 which engage in the T-slots 33 in the plate 31. The plate 31 may itself be angularly adjusted on a cradle or carrier 35 and secured in position by means of bolts 36 which engage in circular T-slots 37 formed in the top face of the cradle.

The grinding wheel is rotated continuously by means of a belt 39 which passes over a pulley 40 secured to the grinding wheel spindle and over idler pulleys 41 and 42 to a pulley 43 secured to a motor shaft 44.

Secured to a sleeve 45 housing the gear spindle 28 is an arm 46 carrying a bevel gear segment 47 which meshes with a segment 48 secured on an arm 49 which is adjustably mounted on the frame 27 of the machine. The segment 48 may be secured in any adjusted position by means of the bolts 50 which fasten the arm 49 to the base 27 and which engage in circular T-slots 51 in the base.

The cradle is oscillated about its axis which, in the machine shown intersects the axis of the blank in its apex and is parallel to the axis of the tool, by means of a crank 52 and a connecting rod 53 connecting the crank to the cradle. The crank is mounted upon a shaft 54 which may be driven in any suitable manner.

During the grinding operation the sleeve 45 is connected through the index mechanism indicated generally at 56, to the blank spindle 28. As the cradle rotates on its axis, then, the blank spindle will rotate on its axis through the meshing engagement of the segments 47 and 48. Mounted on the shaft 54 is a cam 57 which engages a pin 58 secured to the slidable bed or carriage 26 upon which the column 24 is mounted. This cam serves to hold the grinding wheel and gear in operative engagement through a relative rolling movement equal to the angle of face advance of the gear teeth and to then withdraw the grinding wheel to permit indexing of the gear. The mechanism for effecting the indexing may be of any suitable nature, preferably that described in the copending application of E. W. Bullock and A. P. Slade, Serial No. 724,356, filed July 5, 1924.

The throw of the crank 52 is so adjusted that as soon as the required angular rolling movement has been completed and the gear is clear of the grinding wheel, the direction of rotation of the cradle will be reversed for the purpose of indexing the gear and of returning it to original position for grinding of another tooth surface.

The operation of the principal parts of the machine illustrated have already been described. Aside from the differences noted above, this machine is of the same general construction as that described in the application above mentioned. While the invention has been described in connection with a machine in which all the rolling movement is imparted to the blank it will be understood that the angular movement required may be imparted instead all to the tool or part to the tool and part to the blank, as will be obvious to those skilled in the art. Moreover, while the invention has been described particularly with reference to the grinding of longitudinally curved tooth bevel gears, it will be understood that it is applicable also to the grinding of curved tooth spur and hypoid gears, where the amount of movement required will again be determined by the face advance of the teeth of the gears.

In general, while I have described my invention with reference to a particular embodiment, it will be understood that it is not intended to limit the invention to the embodiment described, but this application is intended to cover any variations, uses, or adaptations of my invention, following, in general, the principles of the invention and including such departures from the present disclosure as come within known or customary practise in the gear art and may be applied to the essential features hereinbefore set forth and as fall within the scope of the invention and the limits of the appended claims.

Having thus described my invention, what I claim is:

1. The method of grinding the side tooth surfaces of a longitudinally curved toothed tapered gear, which consists in rotating an annular grinding wheel, having an active side surface of curved profile, in engagement with the gear and simultaneously imparting a relative rolling motion between the wheel and gear through the distance only of face advance of the gear teeth then relatively separating the wheel and gear and indexing the gear.

2. The method of grinding the side tooth surfaces of a longitudinally curved tooth tapered gear, which consists in rotating an annular grinding wheel, having an active side surface of circular arc profile, in engagement with the gear, while simultaneously producing a relative rolling motion between the wheel and gear about the apex of the gear through the angle only of face advance of the gear teeth then relatively separating the wheel and gear and indexing the gear.

3. The method of grinding the side tooth surfaces of a longitudinally curved tooth tapered gear, which consists in imparting to a grinding member having an active side surface of circular arc profile, a curvilinear motion across the face of the gear, while producing a relative rolling motion between the grinding member and gear through the angle only of face advance of the gear teeth, said rolling motion comprising a rotation of the blank on its axis and in timed relation therewith a relative movement between the grinding member and gear about an axis parallel to that about which the curvilinear motion of the wheel takes place then relatively separating the wheel and gear and indexing the gear.

4. In a machine for grinding longitudinally curved tooth gears, a tool support, a rotary annular grinding wheel journaled in said tool support, and provided with an active side surface of curved profile, means for bringing the grinding wheel and gear into engagement, means for rotating the grinding wheel on its axis, means for simultaneously imparting a relative rolling motion between the wheel and gear about an axis intersecting the gear axis in its apex and means for withdrawing the grinding wheel and blank from engagement after a relative rolling motion through the angle of face advance of the gear teeth.

5. In a machine for grinding longitudinally curved tooth gears, a tool support, a gear support, a rotary annular grinding wheel journaled in said tool support and provided with an active side surface of curved profile, a spindle journaled in said gear support adapted to carry the gear to be ground, a cradle upon which one of said supports is mounted, movable about an axis parallel to the axis of the grinding wheel, means for positioning the grinding wheel in engagement with the gear, means for rotating the grinding wheel on its axis, means for simultaneously rotating the blank spindle and cradle to impart a relative rolling movement between the grinding wheel and gear and means for relatively separating the grinding wheel and blank after a relative rolling motion through the angle of face advance of the gear teeth.

6. In a machine for grinding longitudinally curved tooth gears, a tool support, a gear support, a grinding member having an active surface of curved profile, means for moving said grinding member to grind a lengthwise curved tooth surface on a gear, means for imparting a relative rolling motion between the grinding member and gear about an axis parallel to the axis about which the grinding member is moved, and means for periodically withdrawing the grinding member and gear from engagement with each other after a relative rolling motion through the angle of face advance of the gear teeth to permit indexing the gear.

7. In a machine for grinding longitudinally curved tooth gears, a tool support, a gear support, a rotary annular grinding wheel journaled in said tool support and provided with an active side surface of circular arc profile, a spindle journaled in said gear support and adapted to carry the gear to be ground, a cradle upon which one of said supports is mounted, movable about an axis parallel to the axis of the grinding wheel, a bevel gear segment secured to the gear spindle, a second gear segment having a fixed relation to the grinding wheel and meshing with the first segment, means for rotating the grinding wheel on its axis, means for oscillating the cradle to impart a relative rolling motion between the grinding wheel and gear, and means for periodically withdrawing the wheel and gear from engagement with each other after a relative rolling motion through the angle of face advance of the gear teeth to permit indexing the gear.

ARTHUR L. STEWART.